Patented July 17, 1934

1,966,881

UNITED STATES PATENT OFFICE 1,966,881

INDUSTRIAL LIQUID

Géza Braun, New York, N. Y., assignor to Paul J. Sartain, Philadelphia, Pa., Richard C. Fassnacht, New York, N. Y., and Richard C. Schwoerer, Philadelphia, Pa.

No Drawing. Application February 23, 1933, Serial No. 658,141

10 Claims. (Cl. 252—5)

This invention relates to industrial liquids.

This application is a substitute and continuation in part of my copending application Serial #537,875, filed May 16, 1931.

It is an object of this invention to provide an industrial liquid that will be non-explosive, non-combustible or non-flammable, and which will be adapted to a variety of uses.

It is a further object to provide a liquid which will be non-poisonous if by accident it or its vapors should escape from the apparatus with which it is used, into the atmosphere to be breathed by the attendants.

It is a further object to provide a vaporizable liquid which will have a high thermal efficiency for use in various types of engines and motors, refrigerating apparatus and analogous uses.

It is a further object to provide a fluid which will be non-corrosive to the common metals from which machinery is made, such as steel, iron, copper, brass and aluminum, and which will be chemically stable in their presence even though raised to substantial temperatures or subjected to long contact therewith.

Other objects will in part be obvious and will in part appear hereinafter.

As this fluid has properties which are particularly adapted to use as a refrigerant, it may, for specific example, be particularly described as applicable to that use, while at the same time pointing out other uses for which it has been ascertained to be of value, and it will be understood that because of the desirable qualities which the compound possesses, it may be found valuable for a variety of other uses.

Among the most useful of the high boiling point compounds are carbon tetrachoride, methylene dichloride, dichlorethylene, and trichlorethylene. Among these compounds, methylene chloride is the most important. Methylene chloride, however, even when free from deleterious ingredients, such as carbon tetrachloride and chloroform, is nevertheless somewhat corrosive to metals such as iron. This corrosiveness is due to the fact that, when methylene chloride is heated in a metal container, as for example, in iron, for a long time, especially in the presence of moisture, it decomposes slowly, yielding hydrochloric acid and chlorine, which attack the metal.

It has been proposed to unite with a chlorinated hydrocarbon an amine, but this proposal is not successful because of the interaction which occurs between the chlorinated hydrocarbon and the amine.

In accordance with this invention, I have found that certain unsaturated hydro-aromatic compounds, while sufficiently inert to methylene dichloride to permit them to remain dissolved therein for long periods of time without interaction, nevertheless are so completely responsive to chlorine and hydrochloric acid that they will chemically bind the minute traces formed, and thus prevent the corrosive action.

By unsaturated hydro-aromatic compounds I refer to aromatic compounds in which one but not all of the double bonds has been broken by hyrogenation, such as cyclopentene, cyclohexene, pinene, dipentene etc. I have found particularly desirable results, however, in the use of pinene. This compound, dissolved in concentrations of from 1% to 2%, prevents all destructive action by methylene chloride upon the containers.

While the boiling point of pinene is quite high in the neighborhood of 158° C., nevertheless it is sufficiently volatile so that its vapors are present throughout the system in appreciable quantities and in this manner serve as a protection to the entire refrigerating system as well as to those portions in contact with the liquid itself.

The foregoing liquid, moreover, has a high thermodynamic efficency and is of value, therefore, in various types of heat engines and for other similar uses where its various properties may prove of value.

While I have described my fluid as embodying methylene dichloride, it will be understood that pinene or other hydro-aromatic compounds may be used with other halogenated hydrocarbons, with good results.

Having described my invention, what I claim as new and desire to secure by Letters Patent, is:—

1. An industrial liquid comprising halogenated hydrocarbon, having dissolved therein a quantity of non-corrosive unsaturated hydro-aromatic compound to said hydrocarbon and sufficient to neutralize the corrosive action of the hydrocarbon.

2. An industrial liquid comprising halogenated hydrocarbon, having dissolved therein from ½ to 2% of a non-corrosive unsaturated hydro-aromatic compound to said hydrocarbon.

3. An industrial liquid including a halogenated hydrocarbon, having a quantity of pinene dissolved therein sufficient to neutralize the corrosive action of the hydrocarbon.

4. An industrial liquid including a halogenated hydrocarbon, having from ½ to 2% of pinene dissolved therein.

5. An industrial liquid comprising methylene dichloride and a non-corrosive, unsaturated hydro-aromatic compound to said hydrocarbon and in a quantity sufficient to neutralize the corrosive action of the hydrocarbon.

6. An industrial liquid comprising methylene dichloride and from ½ to 2% of a non-corrosive, unsaturated hydro-aromatic compound to said hydrocarbon dissolved therein.

7. An industrial liquid comprising methylene dichloride, having dissolved therein a quantity of pinene sufficient to neutralize the corrosive action of the hydrocarbon.

8. An industrial liquid comprising methylene dichloride having dissolved therein ½ to 2% of pinene.

9. An industrial liquid comprising halogenated hydrocarbon, having dissolved therein a quantity of unsaturated hydro-aromatic hydrocarbon sufficient to neutralize the corrosive action of the halogenated hydrocarbon.

10. An industrial liquid comprising halogenated hydrocarbon, having dissolved therein from ½ to 2% of an unsaturated hydro-aromatic hydrocarbon.

GÉZA BRAUN.

CERTIFICATE OF CORRECTION.

Patent No. 1,966,881.            July 17, 1934.

GEZA BRAUN.

It is hereby certified that error appears in the printed specification of the above numbered patent requiring correction as follows: Page 1, lines 96 and 102, and page 2, lines 2 and 7, claims 1, 2, 5 and 6, respectively, after "compound" insert the word inert; and that the said Letters Patent should be read with these corrections therein that the same may conform to the record of the case in the Patent Office.

Signed and sealed this 25th day of September, A. D. 1934.

Leslie Frazer (Seal)            Acting Commissioner of Patents.